United States Patent [19]
Dickerson

[11] Patent Number: 5,927,447
[45] Date of Patent: Jul. 27, 1999

[54] COMPOSITE BRAKE DRUM

[75] Inventor: Weston E. Dickerson, Okemas, Mich.

[73] Assignee: Hayes Lemmerz International, Inc., Romulus, Mich.

[21] Appl. No.: 09/019,824

[22] Filed: Feb. 6, 1998

Related U.S. Application Data

[60] Provisional application No. 60/051,040, Jun. 27, 1997.

[51] Int. Cl.⁶ ................................................ F16D 65/10
[52] U.S. Cl. ............................................... 188/218 R
[58] Field of Search ..................... 188/218 R; 29/527.5; 192/107 T; 164/100, 108, 111

[56] References Cited

U.S. PATENT DOCUMENTS

| | | | |
|---|---|---|---|
| 2,123,614 | 7/1938 | Sinclair | 188/218 R |
| 2,136,447 | 11/1938 | Jeune | 188/218 R |
| 4,266,638 | 5/1981 | Petersen et al. | 188/218 R |
| 5,224,572 | 7/1993 | Smolen, Jr. et al. | |
| 5,407,035 | 4/1995 | Cole et al. | |
| 5,509,510 | 4/1996 | Ihm | |

*Primary Examiner*—Robert J. Oberleitner
*Assistant Examiner*—Thomas Williams
*Attorney, Agent, or Firm*—Marshall & Melhorn

[57] ABSTRACT

A composite brake drum for a motor vehicle or the like is comprised of a cast metal drum section, a stamped steel drum back, and a cast metal mounting face. The drum section and mounting face are preferably formed of cast iron. The composite drum of the invention provides a reduction in weight and in the amount of machining required as compared with a full cast brake drum. At the same time, the composite brake drum of the invention permits an increase in the thickness of the mounting face as compared with conventional composite brake drums, allowing motor vehicle manufacturers to use the same hubs and keep the vehicle track the same regardless of whether a particular vehicle includes a disc/drum or a disc/disc brake system.

4 Claims, 1 Drawing Sheet

COMPOSITE BRAKE DRUM

RELATED APPLICATION

This application is claiming the benefit, under 35 USC §119(e), of the provisional application filed Jun. 27, 1997 under 35 USC §111(b), which was granted a Ser. No. of 60/051,040. The provisional application, Ser. No. 60/051,040, is hereby incorporated by reference in its entirety.

BACKGROUND OF THE INVENTION

1. Field of the Invention

The present invention relates generally to motor vehicle brake drums and, in particular, to such brake drums formed of a composite construction of, for example, cast iron and steel.

2. Summary of Related Art

Motor vehicle brake drums are often formed entirely of die cast grey iron. However, while cast grey iron is the preferred material for the braking surface of the brake drum, a full cast brake drum is relatively heavy. With the pressure to reduce the weight of all motor vehicle components in an effort to improve fuel economy, relatively less heavy brake drums are deemed to be advantageous.

In response at least in part to the desire for lighter vehicle components, composite brake drums have been developed which comprise a stamped steel drum back with a cast iron braking surface. The structure and method of manufacture of such brake drums are known and are described in more detail in, for example, U.S. Pat. Nos. 2,153,364, 5,138,757, and 5,345,672. Other composite brake drum structures have been suggested as well. For instance, U.S. Pat. No. 4,266,638 describes a composite brake drum comprised of a stamped steel drum back, a cast iron braking surface, and a barrel formed of die cast aluminum or other light weight alloy.

While these composite brake drums have proven to be lighter than comparable full cast brake drums, the stamped steel mounting faces thereof are generally thinner than the mounting faces of the typical brake rotor. Thus, where a vehicle is provided with a disc/drum system, the rear hubs require a thicker flange so that the front and rear wheels track. As a result, different rear hubs will be required for a particular vehicle depending upon whether it is provided with a disc/drum or a disc/disc brake system.

SUMMARY OF THE INVENTION

The present invention is a composite brake drum for a motor vehicle or the like which is comprised of a cast metal drum section, a stamped steel drum back, and a cast metal mounting face. The drum section and mounting face are preferably formed of cast iron. The composite drum of the invention provides a reduction in weight and in the amount of machining required as compared with a full cast brake drum. At the same time, the composite brake drum of the invention permits an increase in the thickness of the mounting face as compared with conventional composite brake drums, allowing motor vehicle manufacturers to use the same hubs regardless of whether a particular vehicle includes a disc/drum or a disc/disc brake system.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

The present invention relates to a composite brake drum for a motor vehicle or the like. It is to be understood that the specific device illustrated in the attached drawings and described in the following specification is simply an exemplary embodiment of the invention defined in the appended claims. Hence, specific dimensions and other physical characteristics relating to the embodiments disclosed herein are not to be considered as limiting, unless the claims expressly state otherwise.

Figure 1:
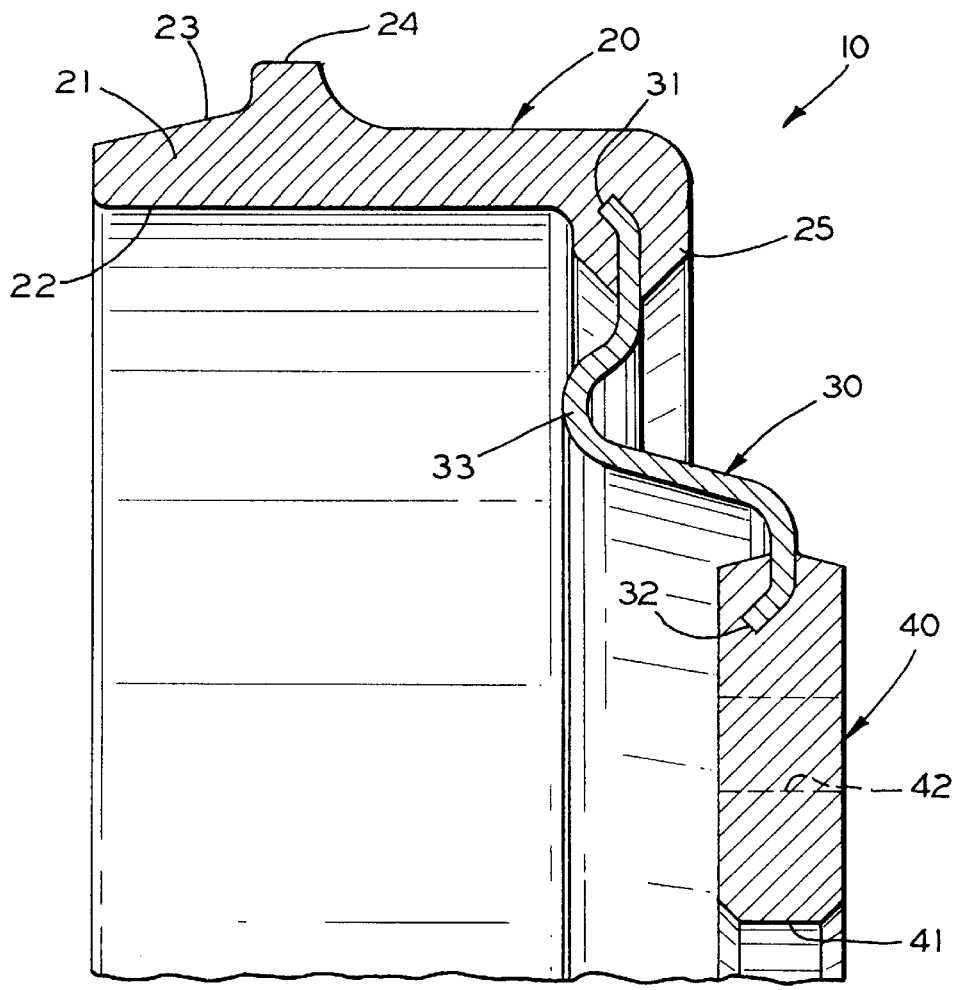
FIG. 1 is a cross sectional view of a portion of the composite brake drum according to the invention.

Referring now to the drawings, there is illustrated in FIG. 1 a composite brake drum in accordance with the invention and generally designated by the reference numeral 10. The brake drum 10 is of composite construction, including a cast metal drum section 20, a steel drum back 30, and a cast metal central mounting face 40.

The drum section 20 is comprised of an annular shell or band 21 having a radially inwardly directed braking surface 22 and a radially outwardly directed surface 23. In the final drum brake assembly, the braking surface 22 is adapted to be selectively engaged by a drum brake shoe (not shown) in the conventional manner. The outwardly directed surface 23 of the drum section 20 is preferably provided with an integral, outwardly extending stiffening ring 24.

The drum section 20 is preferably also provided with a radially inwardly extending annular flange 25 about the edge of the band 21 opposite the open end of the brake drum 10, or to the right as shown in FIG. 1. The flange 25 is secured to an end portion of the drum back 30, as described in further detail below. The radially inner end of the flange 25 is preferably flared radially outwardly from the drum back 30. The cast metal drum section 20 is preferably formed of cast grey iron.

As noted above, the composite brake drum 10 of the invention also includes a drum back 30 formed of steel. The drum back 30 is generally annular, having a radially outer peripheral edge 31 and a radially inner peripheral edge 32. An annular convolute 33 may provided between the radially outer edge 31 and radially inner edge 32 of the drum back 30, as best seen in FIG. 1. The convolute 33 projects in part toward the open end of the brake drum 10, or to the left as illustrated in FIG. 1, and permits flexing of the drum back 30 during braking operation.

Figure 2:
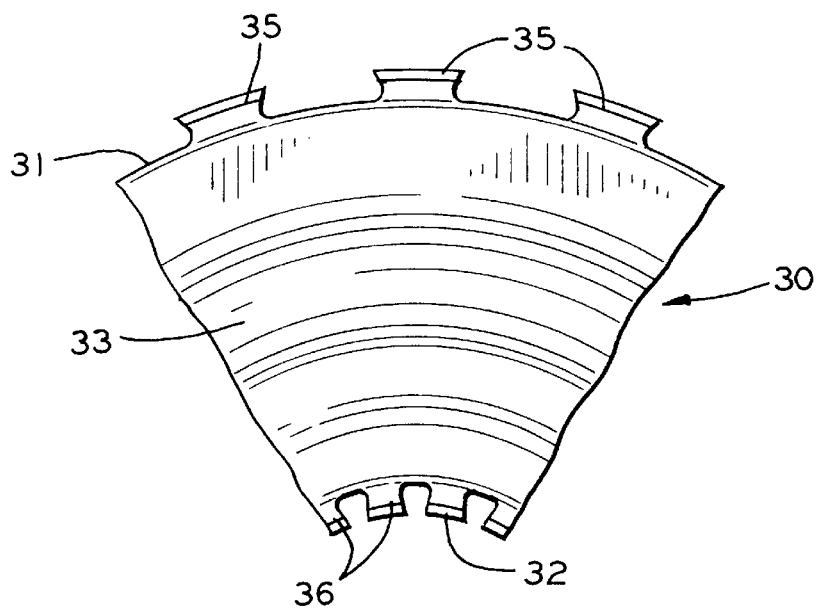
FIG. 2 is a view of a portion of the brake drum back of the composite brake drum illustrated in FIG. 1.

In the preferred embodiment shown in FIG. 2, the outer edge 31 of the drum back 30 is provided with a plurality of circumferentially spaced apart projections, such as the dovetail projections 35 shown. The outer dovetail projections 35 are flared so that they increase in width as they extend radially outwards. The spaces between the projections 35 fill with cast iron during the casting operation to thereby firmly secure the drum section 20 to the drum back 30.

The inner edge 32 of the drum back 30 is similarly provided with a plurality of circumferentially spaced apart projections, such as the dove-tail projections 36 shown in FIG. 2. The inner dovetail projections 36 are flared so that they increase in width as they extend radially inwards. The spaces between the projections 36 also fill with cast iron during the casting operation to thereby firmly secure the mounting face 40 to the drum back 30. In a preferred embodiment, the projections 35 on the outer edge 31 of the drum back 30 are circumferentially off-set from the projections 35 on the inner edge 32 thereof, as shown in FIG. 2.

The composite brake drum 10 of the invention is also provided with a cast metal, annular mounting face 40 for mounting the composite brake drum 10 on an associated drive member (not shown), such as a vehicle axle. The mounting face 40, which is preferably formed of cast grey iron, has a thickness which is greater than the thickness of the drum back 30.

The mounting face 40 is provided with a central pilot aperture 41 in which a spindle hub or the like (not shown) may be closely received, and a plurality of circumferentially spaced apart fastener apertures 42, only one of which is shown in FIG. 1, in which fasteners (also not shown) may be received to mount the composite brake drum 10 on an associated drive mechanism in the conventional manner.

In manufacturing the composite brake drum 10 of the invention, the drum back 30 is formed from sheet steel stock and rolled to the desired configuration. The drum back 30 is then placed in an appropriate mold or molds into which a metal, preferably grey iron, is cast to form the drum section 20 and mounting face 40. The drum section 20 and mounting face 40 may be formed simultaneously or in separate casting operations.

As noted above, the cast iron flows into the spaces between the projections 35 and 36 to securely retain the drum section 20 and mounting face 40 to the drum back 30. The fastener apertures 42 are formed in the mounting face 40 by drilling, punching or the like, or may be cast directly into the mounting face 40. The resulting brake drum 10 may then be subjected to conventional machining and balancing operations.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A composite brake drum comprised of:

an annular steel drum back having a radially outer peripheral edge having a plurality of circumferentially spaced projections and a radially inner peripheral edge having a plurality of circumferentially spaced projections, wherein the projections on the inner peripheral edge of said drum back are circumferentially offset from the projections on the outer peripheral edge of said drum back;

a cast metal drum section secured to said radially outer peripheral edge of said drum back and having a radially inwardly directed braking surface; and a cast metal mounting face secured to said radially inner peripheral edge of said drum back.

2. A composite brake drum as defined in claim 1, wherein said drum section is formed of cast iron.

3. A composite brake drum as defined in claim 1, wherein said mounting face is formed of cast iron.

4. A composite brake drum as defined in claim 1, wherein the thickness of said mounting face is greater than the thickness of said drum back.

* * * * *